United States Patent
Suzuki et al.

(10) Patent No.: US 6,985,501 B2
(45) Date of Patent: Jan. 10, 2006

(54) DEVICE AND METHOD FOR REDUCING DELAY JITTER IN DATA TRANSMISSION

(75) Inventors: Takashi Suzuki, Yokosuka (JP); Toshiro Kawahara, Yokosuka (JP); Masashi Morioka, Yokohama (JP); Nobuhiko Naka, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 893 days.

(21) Appl. No.: 09/827,639

(22) Filed: Apr. 6, 2001

(65) Prior Publication Data
US 2002/0009054 A1    Jan. 24, 2002

(30) Foreign Application Priority Data
Apr. 7, 2000 (JP) ............... 2000-106779

(51) Int. Cl.
*H04J 3/06*    (2006.01)
*H04L 12/26*   (2006.01)
(52) U.S. Cl. .............. 370/517; 370/516; 370/252
(58) Field of Classification Search ........... 370/516, 370/517, 519, 252, 253, 230, 232, 233, 234
See application file for complete search history.

(56) References Cited

U.S. PATENT DOCUMENTS

| 5,640,388 A |   | 6/1997 | Woodhead et al. |
| 5,652,627 A |   | 7/1997 | Allen |
| 5,966,387 A |   | 10/1999 | Cloutier |
| 5,996,018 A | * | 11/1999 | Duault et al. ............ 709/234 |
| 6,259,677 B1 | * | 7/2001 | Jain .................... 370/252 |

FOREIGN PATENT DOCUMENTS

| EP | 0 778 710 A2 | 6/1997 |
| EP | 0 982 970 A2 | 3/2000 |

* cited by examiner

*Primary Examiner*—Ricky Ngo
*Assistant Examiner*—Feben Haile
(74) *Attorney, Agent, or Firm*—Brinks Hofer Gilson & Lione

(57) ABSTRACT

A delay unit 103 adds holding time that has been set by a holding time setting unit 104 to a received data. The holding time is computed based on delay time of received data and the minimum delay time of data received up to a certain point for the purpose of reducing a total delay time. The delay time is estimated in a delay time estimating unit 106 from the difference between a reception time of a packet counted based on an internal clock generator 107 and a time designated by a time stamp in the received packet.

8 Claims, 16 Drawing Sheets

FIG. 5

| Pi | P0 | P1 | P2 | P3 | P4 | P5 | P6 | P7 | P8 | P9 | P10 | P11 | P12 |
|---|---|---|---|---|---|---|---|---|---|---|---|---|---|
| di | 7 | 8 | 6 | 8 | 9 | 8 | 4 | 10 | 7 | 6 | 8 | 5 | 3 |
| dmin | 7 | 7 | 6 | 6 | 6 | 6 | 4 | 4 | 4 | 4 | 4 | 4 | 3 |
| da=dmin+D-di (D=12) | 12 | 11 | 12 | 10 | 9 | 10 | 12 | 6 | 9 | 10 | 8 | 11 | 12 |
| T | 19 | 19 | 18 | 18 | 18 | 18 | 16 | 16 | 16 | 16 | 16 | 16 | 15 |

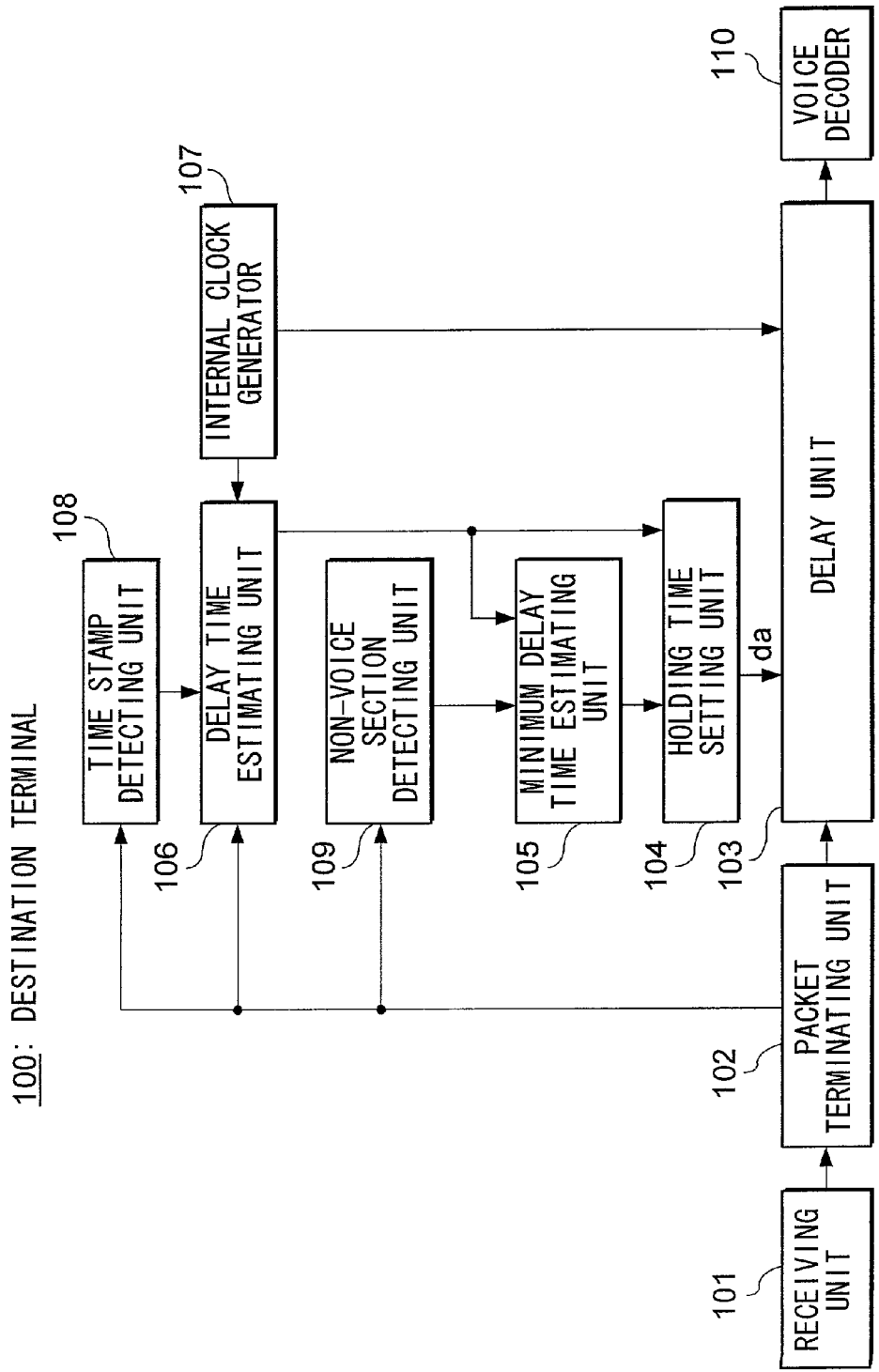

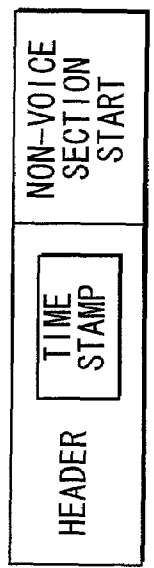
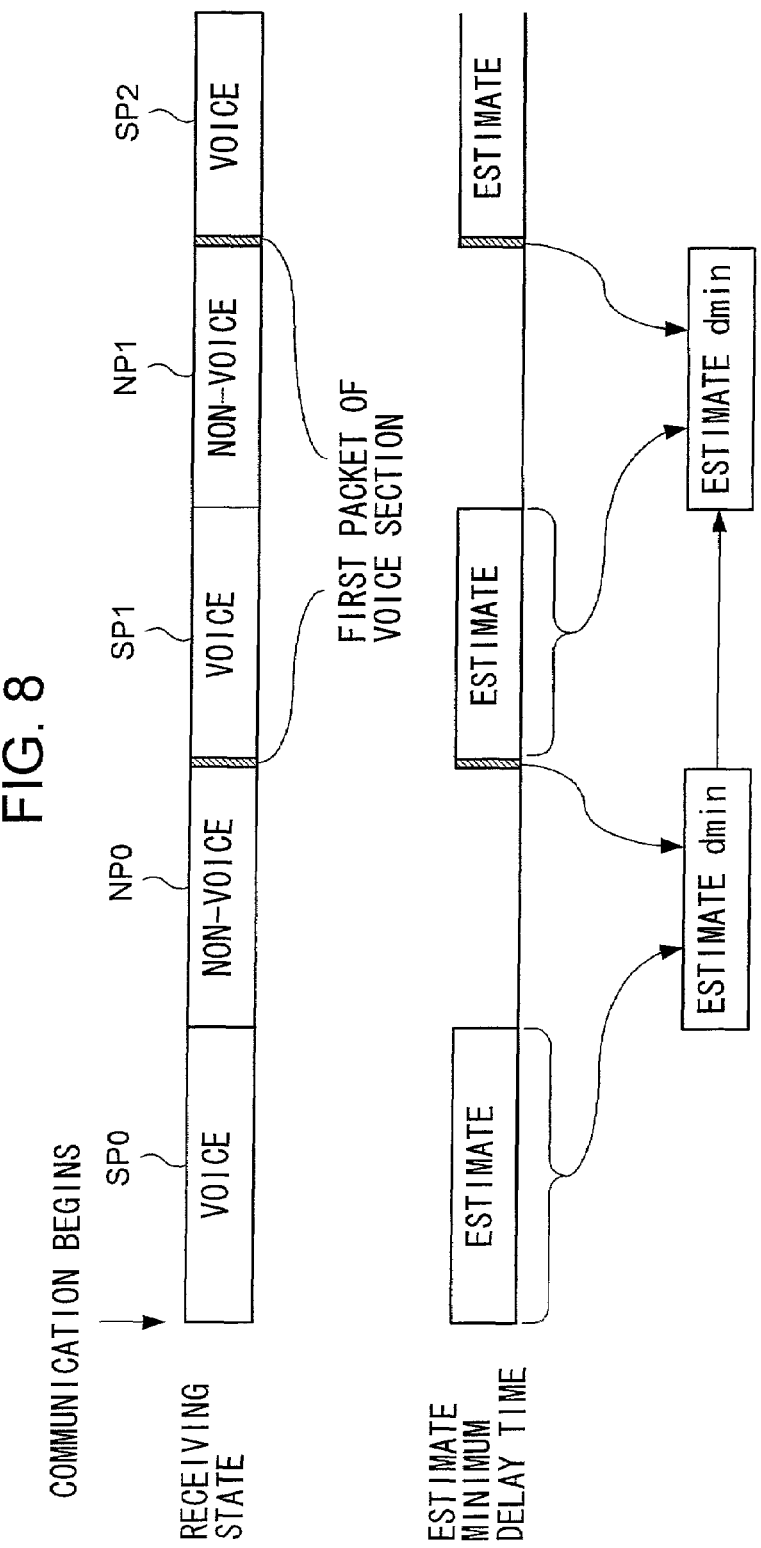

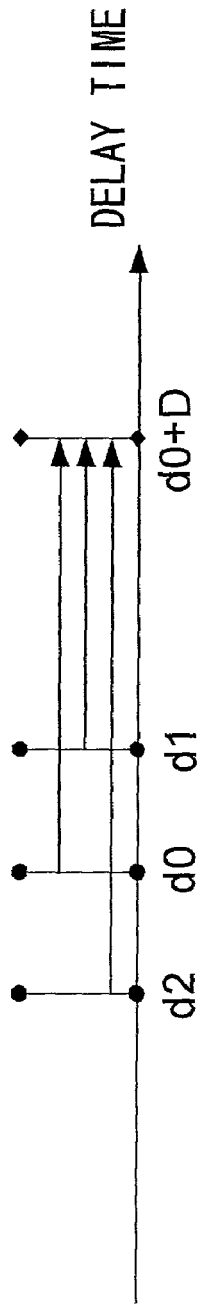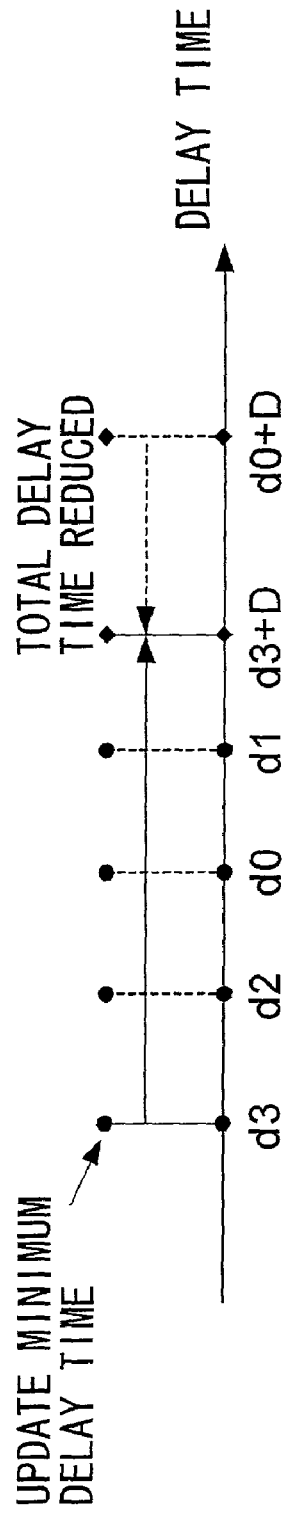

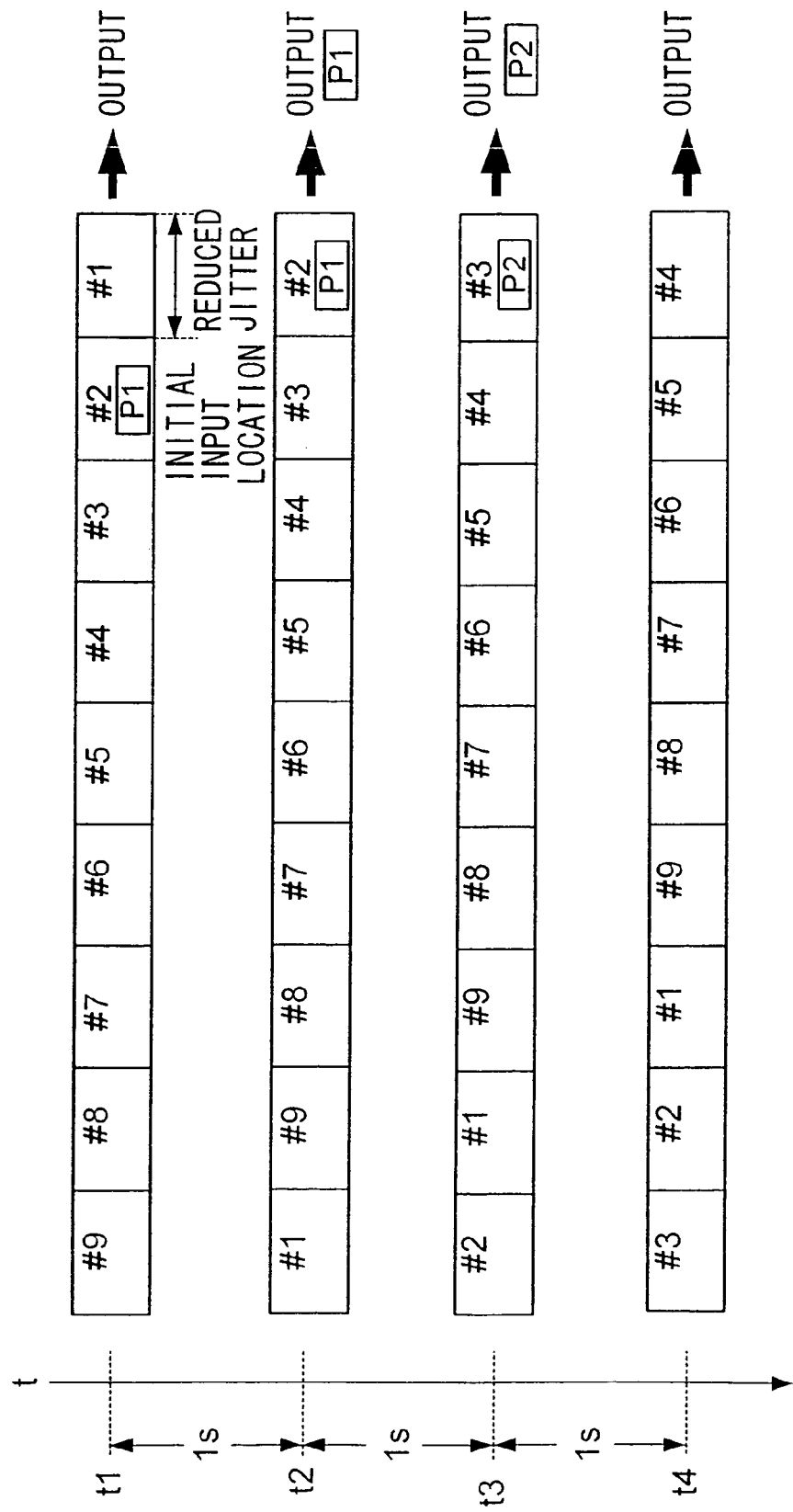

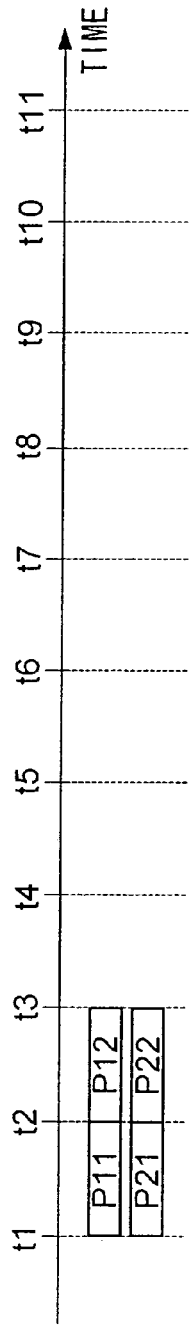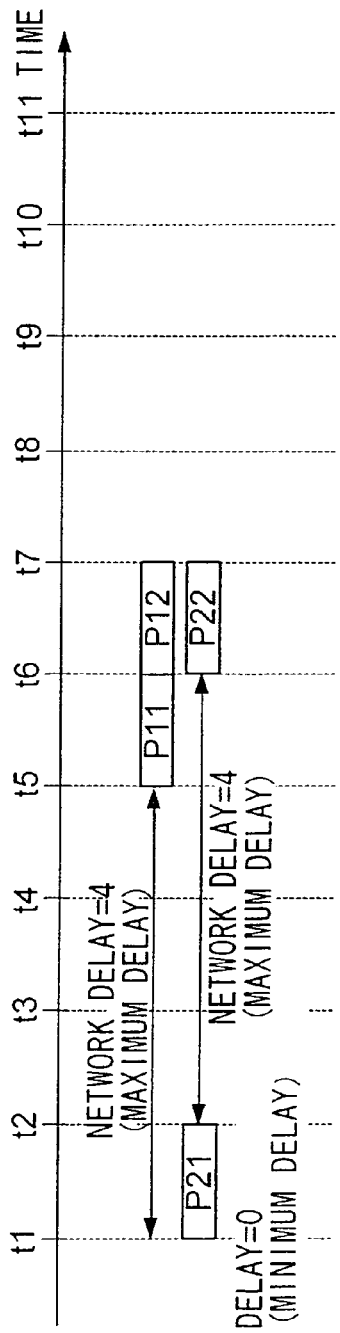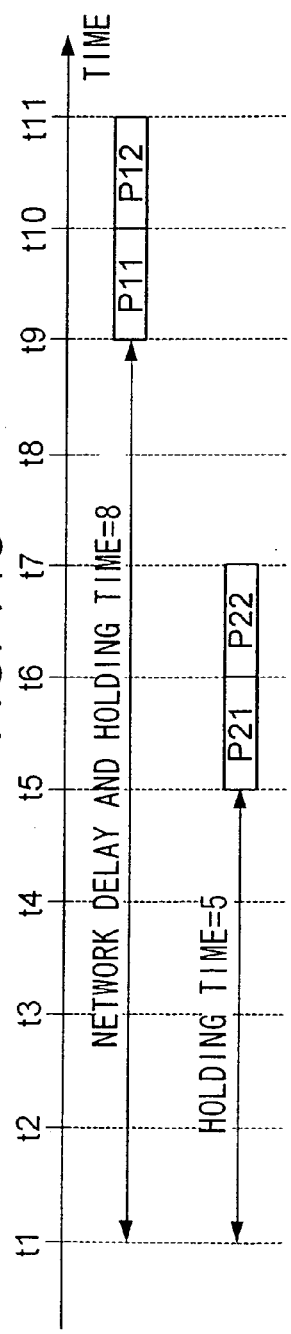

DEVICE AND METHOD FOR REDUCING DELAY JITTER IN DATA TRANSMISSION

BACKGROUND OF THE INVENTION

1. Field of Invention

This invention relates to a delay jitter reducing device for sequentially receiving a series of chronological data segments through a transmission path such as the Internet and delaying an individual data segment for an appropriate amount of time, thereby reducing delay jitter that has occurred in the propagation process of an individual data segment and obtaining chronological data segments from which effects of the delay jitter have been eliminated; and a delay jitter reducing method thereof.

2. Description of the Related Art

One form of data transmission is a real-time transmission that transmits a chronological sample of continuous signals such as, for example, voice signals after loading them to a plurality of consecutive packets. In such a real-time transmission, if delay time in transmitting a packet for individual packets are equal to one another, it is possible to obtain a voice signal of the same waveform as the source node by reproducing a chronological sample in a packet at the time of receiving each packet.

In a network such as the Internet, however, even in a case where a plurality of packet are transmitted from an unchanged source node to an unchanged destination node, the propagation delay time for individual packets are not necessarily the same as one another, and the propagation delay time varies among packets. This variation of the propagation delay time among packets is generally called delay jitter.

In a case where such delay jitter occurs, when a chronological sample is reproduced from received packets at the point of receiving each packet at the destination node, it is not assured that a signal of the same waveform as the original transmission signal can be reproduced from the received packets.

In such a case, destination nodes usually take a step of reducing delay jitter using buffers so as to obtain chronological data with effects of delay jitter eliminated.

This technique for reducing delay jitter will be described in detail with reference to FIG. 12 to FIG. 17.

FIG. 12 is a block diagram showing a configuration example of a real-time voice transmission system. In the system, at a source terminal 10, a voice signal to be transmitted is encoded by a voice encoder 11, and chronological voice packets on which coded data of the voice signal are loaded are generated. A transmission unit 12 transmits these individual voice packets to a destination terminal 30. Each voice packet arrives at the destination terminal 30 after passing a network 20. At the destination terminal 30, voice packets from the source terminal 10 are received by a receiving unit 31 and reserved in a buffer 32. Subsequently, voice packets reserved in the buffer 32 are read from the buffer 32 in the same order as an order generated at the source node and transmitted to a voice decoder 33. The voice decoder 33 receives voice packets transmitted in this way and decodes the voice signal from coded data included in the voice packets.

In the real-time voice transmission system, each voice packet generated in the source terminal 10 is sent out to the network 20 at the same transmission time interval as the generated time interval of each packet. However, as described already, propagation delay time required for these individual packets to reach the receiving terminal 30 is not fixed for each voice packet. Such being the case, the destination terminal 30 adjusts the timing for sending individual voice packets to the voice decoder 33. FIG. 17 shows an example of this timing adjustment. In the example shown in FIG. 17, voice packets P0, P1, and P2 arrive at the destination terminal 30, having taken a propagation delay time of d0, d1, and d2 each. As shown, if each voice packet P0, P1, and P2 can be delayed for D0, D1, and D2 which is an appropriate amount of time for each, a total delay time T in turn can be fixed, where the total delay time is the amount of time required for each voice packet transmitted from the source terminal 10 to the voice decoder 33. The buffer 32 as shown in FIG. 12 is a device used for adjusting delays in order to fix the total delay time of each voice packet in this way. Assuming a minimum delay time of a voice packet as dmin and maximum delay time of a voice packet as dmax in the network 20, the difference between them, D=dmax−dmin, is referred as delay jitter width as a matter of convenience. The buffer 32 in FIG. 12 is required to adjust a variation of delay time in the range of this delay jitter width; in other words, the buffer 32 should be capable of reducing the delay jitter.

Hereinafter described will be on delay adjustment of a voice packet by the buffer 32 with reference to FIGS. 13A and 13B.

In FIG. 13B, there are provided four queues placed above and below in parallel, each queue consisting of a chain of nine boxes in a row. The first queue indicates a state of the buffer 32 at a certain time t1. The second queue indicates a state of the buffer 32 at time t2 that is 1 s later than time t1. Likewise, the third and fourth queue each indicates a state of the buffer 32 at time t3 that is 1 s later than time t2 and at time t4 that is 1 s later than time t3.

In the example shown in FIG. 13B, the buffer 32 has a capacity of storing nine voice packets. Each of the nine boxes in each queue is an area for storing a voice packet, and the notation, #1 to #9, in each box indicates the address of each area.

In the destination terminal 30, one voice packet is read every 1 s from the buffer 32 and sent to the voice decoder 33, where "s" is a unit such as several milliseconds and several dozen milliseconds depending on a data attribute, the unit being suitable for each data attribute. The address of an area where a voice packet is read is also updated one address every fixed time 1 s. In FIG. 13B, an area where a voice packet is currently being read is shown at the right end of each queue, an area on the left next thereto is where the readout is performed 1 s later, and an area on the second left next thereto is where the readout is performed 2 s later. Likewise, the other areas follow; thus, the area at the leftmost of the queue is an area where a voice packet is read 8 s later.

In the example shown in FIG. 13B, a voice packet is read from the area of address #1 at time t1. At time t2, another voice packet is read from the area of address #2, another voice packet is read from the area of address #3 at time t3, and another packet from the area of address #4 at time t4. Therefore, if a voice packet received at time t1 is written into the area of address #4, the voice packet is output from the buffer 32 to the voice decoder 33 at time t4 which is 3 s later. Also, if a voice packet received at time t1 is written into the area of address #9, the voice packet is output from the buffer 32 to the voice decoder 33 8 s later. In this way, controlling a write address into which a received voice packet is written enables delaying the voice packet for an arbitrary amount in the range of 0 s to 8 s.

Therefore, if it is possible to delay a voice packet for an amount of time followed by subtracting an absolute amount of delay time from maximum delay time to be reduced (dmax shown in FIG. 17) provided that we can obtain an absolute amount of delay time since each voice packet was transmitted by the source terminal 10 till it reaches the destination terminal 30, it would be possible to minimize as well as to fix the total delay time for each voice packet transmitted from the source terminal 30 to the voice decoder 33.

However, the destination terminal 30 is not capable of finding how much propagation delay time it has taken for each voice packet to reach the destination. As a consequence, a conventional delay control for each packet is performed in the following method. For simplicity, we assume here that a series of voice packets transmitted from the source terminal 10 at a certain time interval reaches the destination terminal 30 in the same order as the transmission order.

First of all, the destination terminal 30, upon receiving a first voice packet through the network 20, writes the voice packet into an initial input location of the buffer 32 (S1, S2 of FIG. 13A). In the example shown in FIG. 13B, the initial input location is an area corresponding to an address whose assigned number is one larger than an area where a voice packet is read at the point of receiving the first voice packet.

Then, a voice packet on and after the second packet is written in an area where the readout is performed at the earliest timing among areas that are vacant at the point of receiving the subject voice packet (S3 of FIG. 13A).

In the example shown in FIG. 13B, the first voice packet P1 received at time t1 is written in the area of address #2, which is the initial input location. Then, no voice packet is received at time t2, and the voice packet P1 is read from the area of address #2 and sent to the voice decoder 33. When it turns time t3, a second voice packet P2 is received. It appears to have taken delay time that is 1 s longer than the voice packet P1 for the voice packet P2 to be transmitted. Then, the voice packet P2 is written in an area where the readout is performed at the earliest timing among vacant areas at the receiving time t3, that is, the area of address #3. Subsequently, at time t3, the voice packet P2 is read immediately after being written and is supplied to the voice decoder 33.

Thus, even if the voice packet P1 and P2 are transmitted from the source terminal 10 at 1 s time interval between them, the difference of 1 s in propagation delay time between the two voice packets causes the arrival at the destination terminal 30 at the time interval of 2 s. However, even in such a case, determining an initial input location of the buffer 32 and applying deference by the buffer 32 as described above enables supplying the voice packet P1 and P2 to the voice decoder 33 at the same time interval as the transmission interval of the source terminal 10. In other words, it is possible to reduce delay jitter as large as 1 s by allotting an initial input location for a first voice packet to an area which will be output later than the read area as of the receiving by an area equivalent to 1 s.

Looking at a group of serial voice packets transmitted from the source terminal 10 to the destination terminal 30, their propagation delay time vary from the minimum value dmin to the maximum value dmax as shown for example in FIG. 17. In a conventional art, when a first voice packet P1 is received at the destination terminal 30, an initial input location is allotted to an area corresponding to an address that will be output later than the readout address as of the receiving by the number of areas equivalent to the delay jitter width D=dmax−dmin, and the voice packet P1 is written therein. Deciding the initial input location in this way enables the complete elimination of pre-assumed delay jitters.

More detailed description will be given hereinafter with reference to FIGS. 14A, 14B, 14C, 15 and 16. In the following description, it is assumed that the delay jitter width is 4 s. Also, for the sake of simplicity, we will assume a case where the minimum delay time dmin is 0 s and the delay jitter width of the network 20 is equal to the maximum delay time dmax.

In FIG. 14A, the voice packets P11 and P12 are packets output consecutively from the voice encoder 11 of the source terminal 10. Likewise, the voice packets P21 and P22 are packets output consecutively from the voice encoder 11 of the source terminal 10. FIG. 14B illustrates each voice packet that has reached the receiving unit 31 of the destination terminal 30. In the example shown, the voice packets P11 and P12 reach the receiving unit 33, both being delayed the maximum delay time dmax=4 s. On the other hand, the voice packets P21 and P22 reach the receiving unit 31, the former being delayed the minimum delay time dmin=0 s and the latter being delayed the maximum delay time dmax=4 s. FIG. 14C then illustrates each of the voice packets being supplied to the voice decoder 33 after deference being applied.

FIG. 15 shows how deference is performed to the packets P11 and P12 by the buffer 32, and FIG. 16 shows how deference is performed to the packets P21 and P22 by the buffer 32.

As shown in FIG. 15, the voice packet P11 that has reached the receiving unit 31 at time t5 is written in the area of address #5, which is the initial input location, thereby being delayed for delay time of 4 s and output from the buffer 32 to the voice decoder 33 at time t9. Then, the voice packet P12 that has reached the receiving unit 31 at time t6 is written in the area of address #6, an area where a readout will be performed at the earliest timing among vacant areas as of the receiving, thereby being output from the buffer 32 at time t10 that is the next timing of the output time for the voice packet P11.

On the other hand, deference such as follows is performed for the voice packet P21 and P22. First of all, as shown in FIG. 16, the voice packet P21 that has reached the receiving unit 31 at time t1 is written in the area of address #5, which is the initial input location, thereby being delayed for delay time of 4 s and output from the buffer 32 at time t5. Then, the voice packet P22 that has reached the receiving unit 31 at time t6 is written in an area where a readout will be performed at the earliest timing among vacant areas as of the receiving, thereby being output immediately from the buffer 32.

As described so far, if an initial input location is set to an area of address which will be output later than the read address as of the receiving by the number of areas equivalent to the delay jitter width D=dmax−dmin, it becomes possible to reduce every delay jitter in the range of the minimum value dmin and the maximum value dmax.

However, in the conventional art described above, that a first voice packet received by the destination terminal 10 is delayed for delay time which is equivalent to the delay jitter width D means that the same amount of delay time will be applied for the succeeding voice packets. If it is assumed that delay time required for the first voice packet to pass a network is d0 here, the total delay time T will be D+d0, the total delay time T designating the amount of time required for each voice packet to reach the voice encoder 33 of the destination terminal 30 since the point of being output from the voice encoder 11 of the source terminal 10. However, the delay time of the first voice packet varies from the minimum value dmin to the maximum value dmax, which in turn makes the total delay time T depended on the delay time d0 of the first voice packet. That means that, in the case of the delay time d0 of the first voice packet being the minimum delay time dmin, the total delay time T can be made short. However, in a case where the delay time of the first voice packet is as long as the maximum delay time dmax, the total delay time T results in a long period of time two times the maximum delay time dmax. In recent years, the prevalence of such as an Internet telephony using VoIP (Voice over IP) technique has caused a call for high-quality communication, which requires the shortening in the total delay time. Thus, it is unfavorable that the total delay time T becomes long for the sake of reducing delay jitter.

SUMMARY OF THE INVENTION

This invention is made for solving the above-mentioned problem and aims at providing a delay jitter reducing device capable of shortening the total delay time and a delay jitter reducing method thereof.

In order to solve the above-mentioned problem, this invention provides a delay jitter reducing device, comprising: a receiving unit sequentially receiving chronological data segments through a network; a time detecting unit for obtaining a reception time of each data segment received by said receiving unit; transmission time estimating means for estimating transmission time of each data segment received by said receiving unit; a delay time estimating unit for estimating a delay time required for transmitting each data segment based on said reception time and said transmission time of each data segment; a minimum delay time estimating unit for estimating a minimum delay time in transmitting a data segment through the network from the estimated values of delay time of a plurality of data segments obtained from said delay time estimating unit; relative delay time computing means for obtaining a relative delay time by subtracting said minimum delay time from the estimated value of delay time of a data segment estimated by said delay time estimating unit; and delay means for obtaining an amount of holding time corresponding to each data segment by subtracting the relative delay time of each data segment from a maximum delay time to be reduced, and outputting each data segment after delaying each data segment for the amount of holding time corresponding to each data segment.

Such a delay jitter reducing device enables the estimation of a minimum value of delay time required for transmitting data segments such as packets, thereby determining holding time of deference for reducing delay jitter based on the minimum value. As a result, delay jitter of a group of received data segments is reduced as well as the total delay time thereof is shortened.

The embodiments of the present invention include an embodiment such as of producing and selling a device which reduces delay jitter as disclosed in the above-mentioned embodiments as well as an embodiment of distributing through a telecommunication line a program for making a network-connected computer function as a delay jitter reducing device as disclosed in the above embodiments and an embodiment of distributing such a program recorded in a computer-readable recording medium.

BRIEF DESCRIPTION OF THE DRAWINGS

FIG. 5 is a time chart illustrating an operation of the destination terminal in the embodiment.

FIG. 6 is a block diagram showing a configuration of a destination terminal in a second embodiment of the present invention.

FIG. 7 is a diagram showing a packet notifying the start of a non-voice section.

FIG. 8 is a time chart showing an operation of the embodiment.

FIGS. 11A and 11B illustrate an effect of the embodiment.

FIG. 13B is a time chart illustrating the operation of the system.

FIGS. 14A, 14B, and 14C are time charts illustrating an example of the system.

DETAILED DESCRIPTION

An embodiment of the present invention will be described hereinafter with reference to the drawings.

A. First Embodiment

Figure 1:
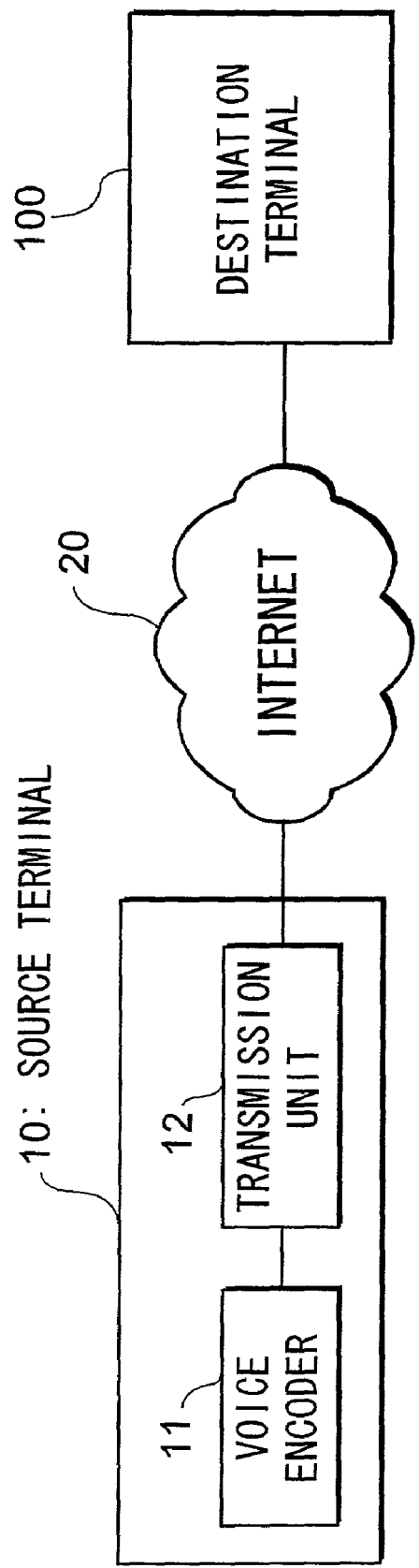
FIG. 1 is a block diagram showing an overall configuration of a real-time voice transmission system with respect to a first embodiment of the present invention.

FIG. 1 is a block diagram showing a configuration of a real-time voice transmission system that is a first embodiment of the present invention. In the real-time voice transmission system, there are provided a source terminal 10 with a voice encoder 11 and a transmission unit 12 as in the conventional art. The source terminal 10 and a destination terminal 100 are both VoIP terminals. This real-time voice transmission system is for providing an Internet telephone service to a user.

Figure 2:
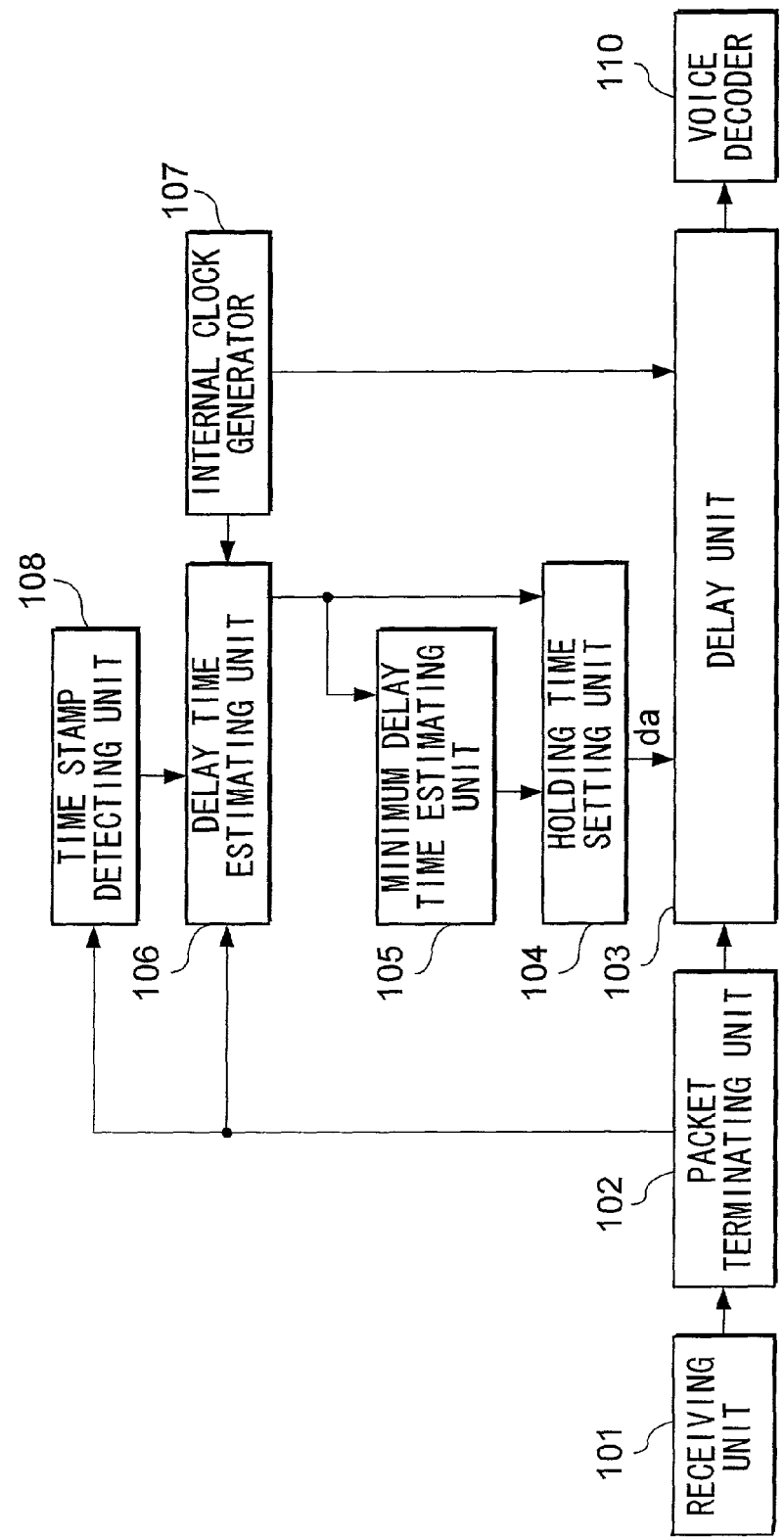
FIG. 2 is a block diagram showing a configuration of a destination terminal in the embodiment.

FIG. 2 is a block diagram showing a configuration of the destination terminal 100. In this figure, a receiving unit 101 is a device which receives voice packets from the source terminal 10 through the Internet 20. A packet terminating unit 102 is a device that terminates a protocol of the Internet 20. A voice packet received by the receiving unit 101 is transmitted through the packet terminating unit 102 to a time stamp detecting unit 108 and a delay time estimating unit 106. Also, the packet terminating unit 102 fetches coded voice data from the payload section of the received voice packet and supplies the data to a delay unit 103.

An internal clock generator 107 generates an internal clock of a certain frequency and supplies the generated clock to the delay time estimating unit 106 and a delay unit 103.

Figure 3:
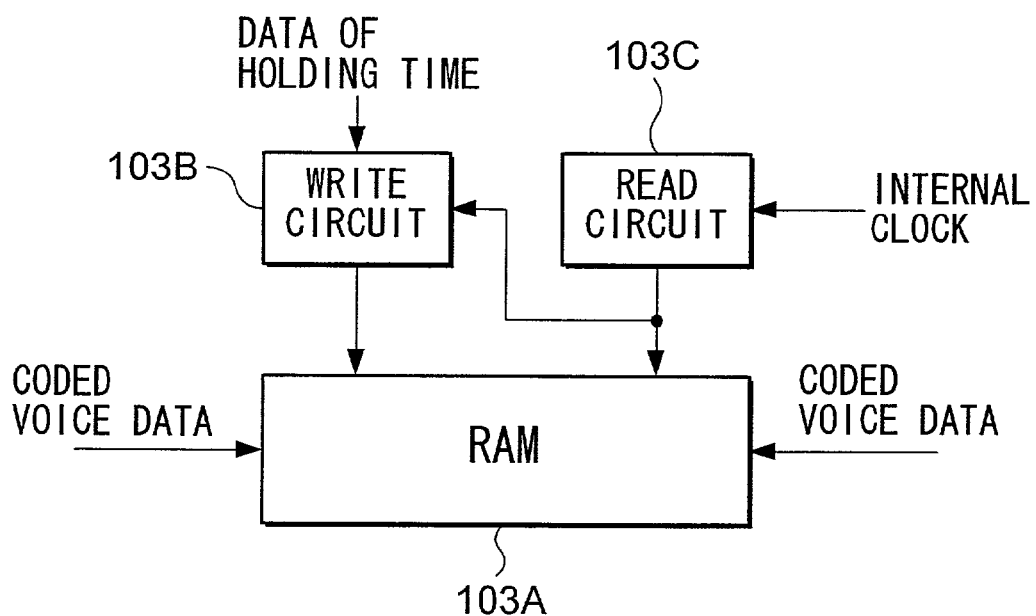
FIG. 3 is a block diagram showing a configuration of a delay unit in the embodiment.

The delay unit 103 is supplied with data of holding time from a holding time setting unit 104. The description will be given later on how to generate the data of holding time. The delay unit 103 is a device that supplies a voice decoder 110 after holding coded voice data that have been supplied from the packet terminating unit 102. The delay unit 103, as shown for example in FIG. 3, comprises a RAM 103A, a write circuit 103B for writing coded voice data supplied from the packet terminating unit 102 into the RAM 103A, and a read circuit 103C for reading out coded voice data from the RAM. The read circuit 103C counts an internal clock supplied from the internal clock generator 107, supplies the counted value to the RAM 103A as a read address, reads out coded voice data from an area in the RAM 103A corresponding to the read address, and outputs the data to the voice decoder 110. When coded voice data of a voice packet is output from the packet terminating unit 102, the write circuit 103B obtains a write address based on a read address that is output from the read circuit 103C as of that point and data of holding time that is output from the holding time setting unit 104. Then, the write address is supplied to the RAM 103A, and the coded data of the voice packet is written into an area corresponding to the write address of the RAM 103A. The coded voice data written in the RAM 103A, when time corresponding to the data of holding time elapses at a later time, are read from the ROM 103A and output to the voice decoder 110.

The voice decoder 110 is a device which decodes voice data from coded data that are output from the delay unit 103.

The time stamp detecting unit 108, the delay time estimating unit 106, a minimum delay time estimating unit 105, and the holding time setting unit 104 cooperate to form a means for generating data of holding time.

Figure 4:
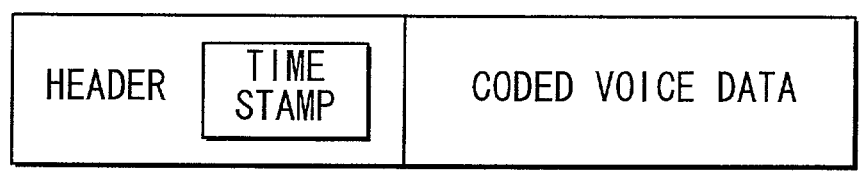
FIG. 4 is a block diagram showing a configuration of a voice packet in the embodiment.

As described already, the time stamp detecting circuit 108 is supplied with voice packets received by the receiving unit 101. The source terminal 10 (FIG. 1), where the voice packets are originated, contains a counter that counts a clock of predetermined frequency and outputs time data designating a current time and reads the time data from the counter at the point of generating a voice packet, so that the time data is included in the header of the voice packet as a time stamp. FIG. 4 is an example of voice packets with such a time stamp in the header. The time stamp detecting circuit 108 fetches the time stamp from the received voice packet and send it to the delay time estimating unit 106.

The internal clock generator 107 outputs an internal clock of the same frequency as that of the clock used in the source terminal 10. The delay time estimating unit 106 counts an internal clock that is output from the internal clock generator 107 and generates time data designating a current time. This time data almost coincides with the time data generated in the source terminal 10, but there is no assurance of the complete coincidence. However, both time data units are generated by counting a clock whose frequency is identical to each other. Therefore, the difference in time between both time data units is fixed. The delay time calculating circuit 106, when a time stamp of a voice packet is supplied from the time stamp detecting circuit 108, obtains an estimated value of delay time required for the transmission of a voice packet by subtracting the time stamp from the time data of the receiving time of the voice packet.

The minimum delay time estimating unit 105 is a device for estimating a minimum delay time required for the transmission of a voice packet. The minimum delay time estimating unit 105 sequentially receives from the delay time estimating unit 106 estimated values of delay time of voice packets that have been received in sequence by the receiving unit 101. Every time the minimum delay time estimating unit 105 receives an estimated value, it selects the smallest value among estimated values of delay time up to that point and regards the selected value as an estimated value of the minimum delay time.

The holding time setting unit 104 is a device which, every time a voice packet Pi (i=0,1,2, . . . ) is received, computes data of holding time da corresponding to the voice packet Pi from the equation below:

$$da = d\min + D - di \quad (1)$$

where di is delay time of a voice packet Pi estimated by the delay time estimating unit 106, dmin is a minimum delay time of all the voice packets up to the voice packet Pi, and D is a pre-set maximum delay time.

The data of holding time da is used in computing a write address for writing a coded voice data unit of a voice packet into the RAM 103A, as described above.

FIG. 5 is a diagram showing an operation of the present embodiment. An operation of the present embodiment will be described with reference to the figure.

In the destination terminal 100, when a first voice packet P0 is received, the delay time estimating unit 106 will calculate an estimated value of delay time according to the following equation from reception time c0 and time t0 designated by the time stamp fetched from the voice packet P0:

$$d0 = c0 - t0 \quad (2)$$

from which, in the example shown, delay time of the first voice packet P0 is found out to be 7 s.

Then, the minimum delay estimating unit 105 regards the d0=7 s as an initial estimated value of the minimum delay time dmin.

Subsequently, the holding time setting unit 104 obtains data of holding time da corresponding to the voice packet P0 as follows:

$$\begin{aligned} da &= d\min + D - d0 \quad (3) \\ &= 7s + 12s - 7s \\ &= 12s \end{aligned}$$

where D is set 12 s in this example.

The data of holding time da obtained by the holding time setting unit 104 is sent to the delay unit 103. The delay unit 103 delays the coded voice data of the voice packet P0 for an amount of time equivalent to the data of holding time da to supply the coded data to the voice decoder 110.

When a subsequent voice packet Pi is received at a later time, the delay time estimating unit 106 calculates an estimated value of delay time according to the following equation from reception time data ci and time ti designated by a time stamp fetched from the voice packet Pi.

$$di = ci - ti \quad (4)$$

Then, the minimum delay time estimating unit 105 compares the di against an estimated value of the minimum delay time dmin as of that point, and maintains the current estimated value dmin of the minimum delay time when it is found di≧dmin; when it is found di<dmini, dmin is replaced with a value of di.

The holding time setting unit 104 computes data of holding time da corresponding to the voice packet Pi from the aforementioned equation (1). Then, the delay unit 103 delays the coded voice data of the voice packet Pi for an amount of time equivalent to data of holding time da to supply the coded data to the voice decoder 110.

The above operation is performed for all the voice packets.

In the beginning of a session, an estimated value of the minimum delay time dmin is updated relatively often. However, the more voice packets are received and the more times the minimum delay time is estimated, the closer the estimated value of the minimum delay time dmin becomes to a true value of the minimum delay time. Therefore, as a time interval for updating the estimated value of the minimum delay time dmin becomes longer, the estimated value of the minimum delay time dmin becomes stabilized. In the example shown, an estimated value of the minimum delay time dmin changes in a way such as becoming 7 s at the point of receiving the voice packet P0, 6 s at the point of receiving the voice packet P2, 4 s at the point of receiving the voice packet P6, and 3 s at the point of receiving the voice packet P12.

Total delay time T since a voice packet was output from the voice encoder 11 of the source terminal 10 until coded voice data thereof are output to the voice decoder 110 of the destination terminal 110 is obtained from the following equation:

$$T = di + da \quad (5)$$
$$= di + dmin + D - di$$
$$= dmin + D$$

As shown for example in FIG. 5, as more voice packet are received, the estimated value of the minimum delay time dmin gradually converges into a small value. As a result, the total delay time T also gradually converges into a small value.

Since total delay time T depends on an estimated value of the minimum delay time, the total delay time T changes relatively often in the beginning of a session. However, the more voice packets are received, the longer a time interval for updating the total delay time T becomes, and the value of total delay time T finally reaches a minimum value.

B. Second Embodiment

FIG. 6 is a block diagram showing a configuration of a destination terminal 100 with respect to a second embodiment of the present invention. The destination terminal 100 in this embodiment further contains a non-voice section detecting unit 109 in addition to the components of the destination terminal 100 for the first embodiment. The non-voice section detecting unit 109 monitors the payload of voice packets received in sequence and detects non-voice sections. To describe further in detail, a source terminal 10 in the present embodiment, when a user of the terminal 10 stops vocalization and a non-voice section in which there is no voice to be transmitted begins, transmits to the destination terminal 100 a voice packet which includes information designating the start of the non-voice section in the payload as shown in FIG. 7. The non-voice section detecting unit 109 of the destination terminal 100, by receiving this voice packet, detects the start of a non-voice section. When the destination terminal 100 receives a voice packet including some kind of coded voice data in the payload at a later time, the non-voice section detecting unit 109 detects the end of the non-voice section.

Subsequently, a holding time setting unit 104 in the present embodiment, when the end of the non-voice section is detected by the non-voice section detection unit 109, computes data of holding time da from an estimated value of delay time for a first voice packet of a voice section obtained from a delay time estimating unit 106, an estimated value of the minimum delay time obtained from a minimum delay time estimating unit 105 at that point, and a known delay jitter width, the result being output to a delay unit 103. The computing of data of holding time and the supplying of the data to the delay unit 103 are performed every time non-voice section begins.

Figure 9:
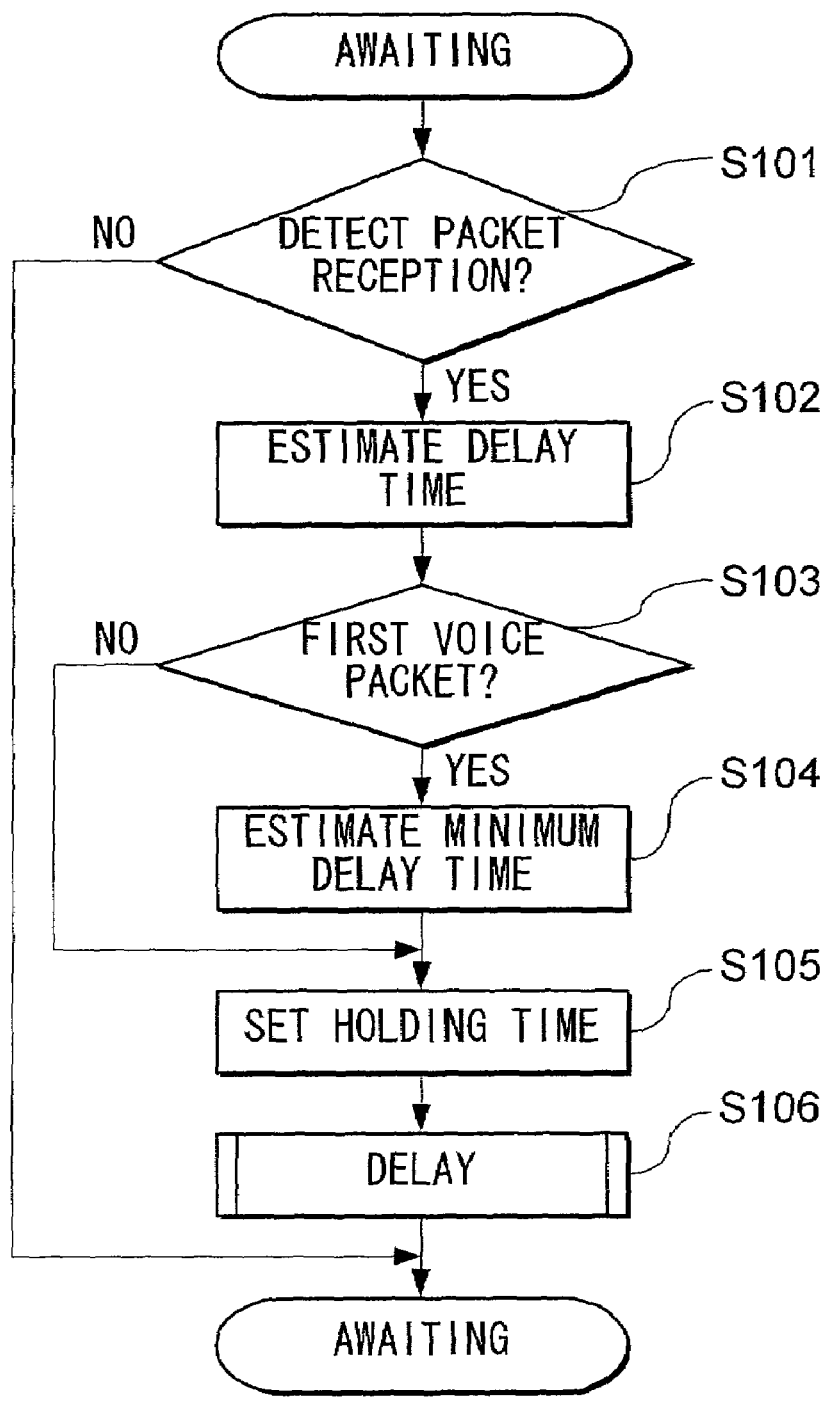
FIG. 9 is a flow chart illustrating an operation of the embodiment.

FIG. 8 is a time chart showing an operation of the destination terminal 100 with respect to the present embodiment, and FIG. 9 is a flowchart showing an operation of the destination terminal 100 with respect to the present embodiment. The operation of the present embodiment will be described hereinafter with reference to these figures.

When a phone-to-phone conversation between the source terminal 10 and the destination terminal 100 is initiated, a voice section and non-voice section are repeated alternately as shown in FIG. 8, the voice section being a period where voice packets representing the voice of a caller are received by the destination terminal 100 and the non-voice section being a period where no voice packets are received.

As in the first embodiment, every time a voice packet is received by the receiving unit 101, the delay time estimating unit 106 obtains an estimated value of delay time for the voice packet (step S101 and S102).

In a first voice section SP0, the minimum delay time estimating unit 105 considers an estimated value of delay time for a first voice packet P0 to be an estimated value of the minimum delay time dmin (step S103 and S104). As for each of the received voice packets in the first voice section SP0, data of holding time da is computed from the aforementioned equation (1), and a result thereof is set to the delay unit 103 (step S105). In the delay unit 103, a write address is found out from the data of holding time da and a read address of a RAM 103A as of that point. Then, coded voice data of a voice packet is written into an area of the RAM 103A corresponding to the write address. The coded voice data, after time has elapsed by an amount of time equivalent to the data of holding time da, are read from the RAM 103A and supplied to a voice decoder 110 (step S106).

Then, when a voice packet as illustrated in FIG. 7 is received by the receiving unit 101, the non-voice section detecting unit 109 detects the start of a non-voice section NP0. Instead of transmitting a packet for notifying the start of a non-voice section from the source terminal 10 to the destination terminal 100 in such a way, it is also possible to detect the start of a non-voice period when a voice packet is not received over a certain period at the destination terminal 100.

We assume that the voice section SP0 changes to the non-voice section NP0 and that a subsequent voice section SP1 begins at a later time. When a first voice packet P0 of the voice section SP1 is received by the receiving unit 101, the delay time estimating unit 106 finds out an estimated value of delay time d0 of the voice packet P0 (S101 and S102 in FIG. 6).

Subsequently, the minimum delay time estimating unit 105 estimates a minimum delay time dmin from among estimated values of delay time for all the voice packets that have been received up to that point (step S104). In the present embodiment, an estimated value of the minimum delay time can be updated only when a first voice packet of a voice section is received. In other words, once a voice section begins, the estimated value of the minimum delay time is not updated even if a value of delay time is estimated to be smaller than that of the minimum delay time at the beginning. It is when the voice section ends to turn to a non-voice section and another voice section begins that the update can be made.

At the point of receiving the first voice packet P0 of the voice section SP1, the holding time setting unit 104 obtains the estimated value of the minimum delay time dmin from the minimum delay time estimating unit 105 (step SP104).

Subsequently, the holding time setting unit 104 computes data of holding time da from the aforementioned equation (1), and supplies a result to the delay unit 103 (step S105).

In the delay unit 103, a write address is found from the data of holding time da and a read address of the RAM 103A of that point. Then, coded voice data of the voice packet P0 are written in an area of the RAM 103A corresponding to the write address (step S106).

In the voice section SP1 as in the voice section SP0, an estimated value of delay time di is calculated as to a voice packet Pi received by the receiving unit 101 (step S102). The estimated value of delay time di obtained in the voice section SP1 is used for estimating a minimum delay time when a voice section SP2 is started at a later time (step S103 and S104).

The operation of the present embodiment will be described further in detail with concrete examples shown.

Figure 10A:
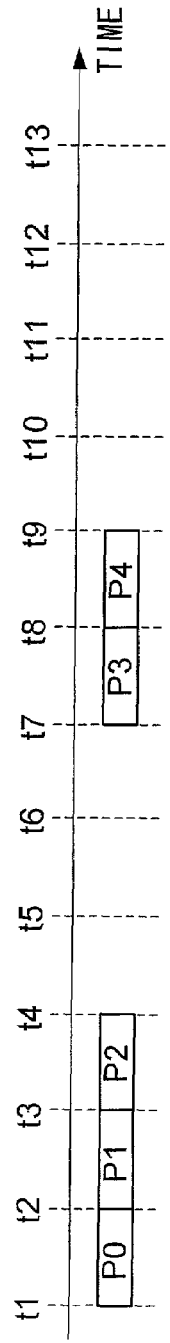
FIGS. 10A, 10B, and 10C are time charts illustrating an operational example of the embodiment.
Figure 10B:
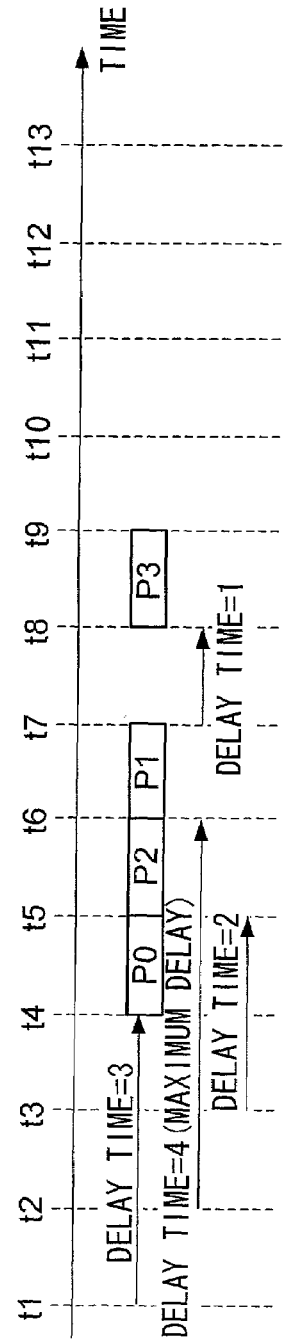
Figure 10C:
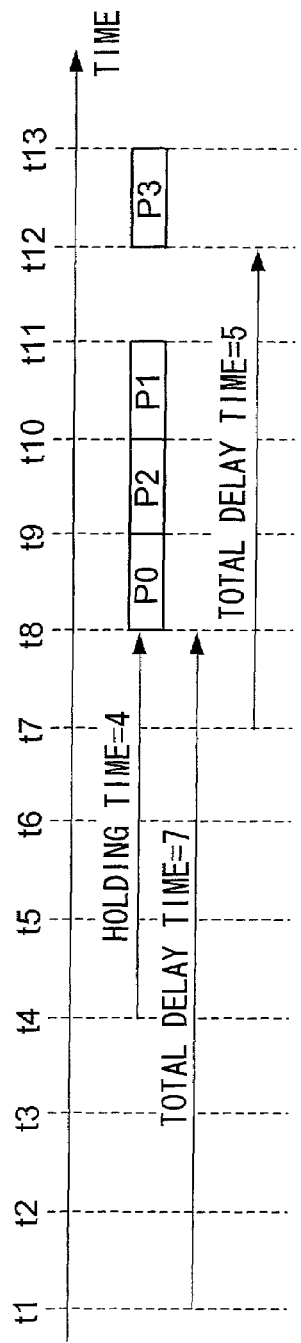
Figure 12:
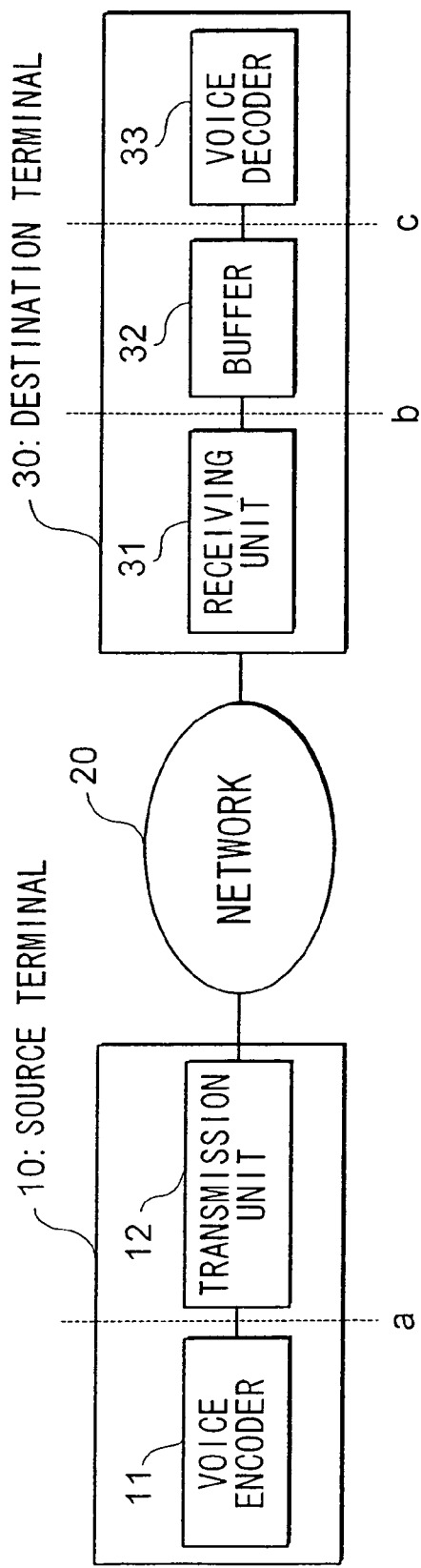
FIG. 12 is a block diagram showing a configuration example of a real-time voice transmission system.
Figure 13A:
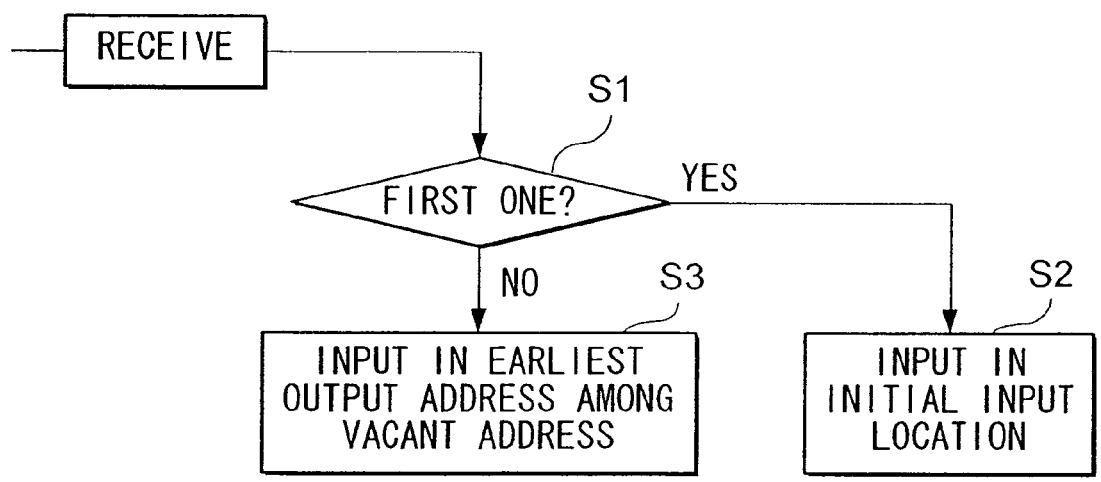
FIG. 13A is a flow chart illustrating an operation of the system.
Figure 15:
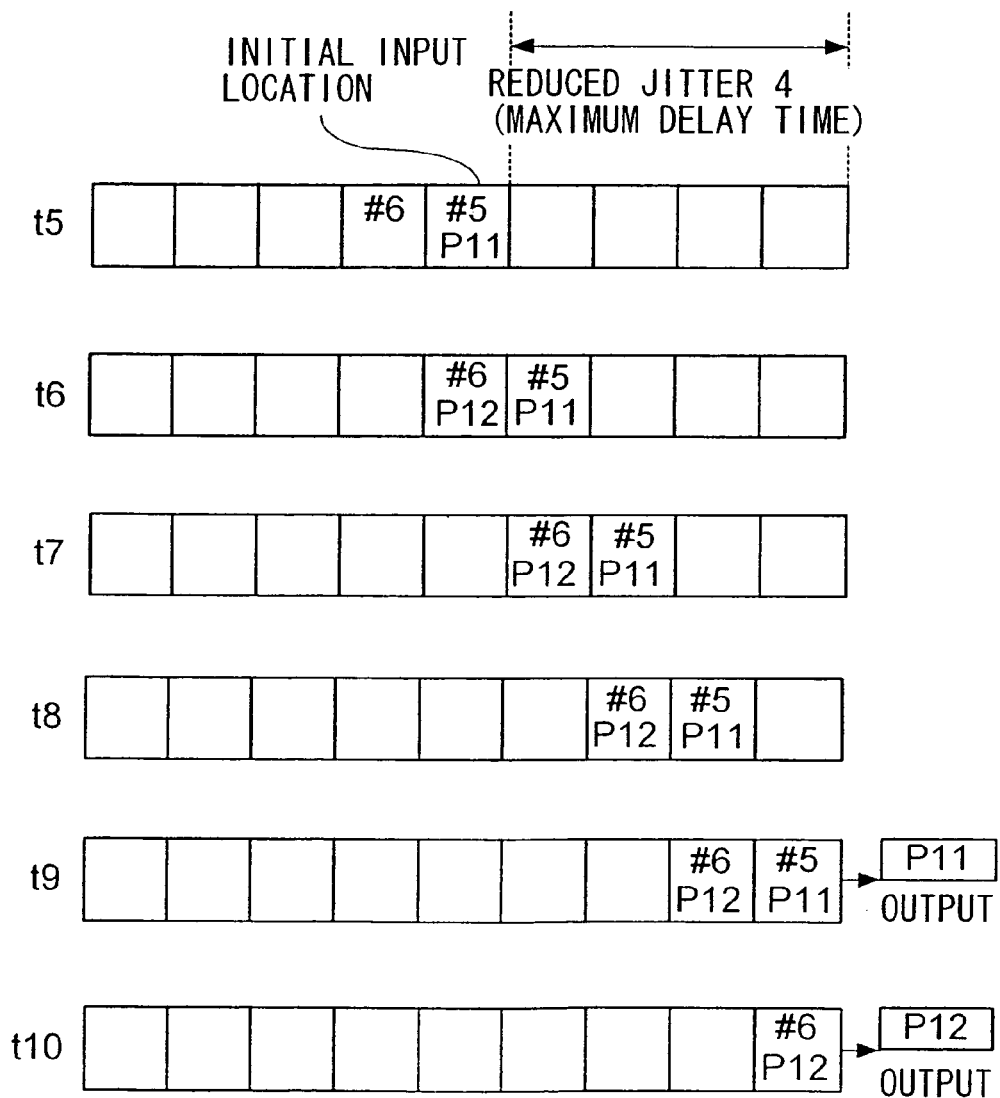
FIG. 15 is an operational example of the system.
Figure 16:
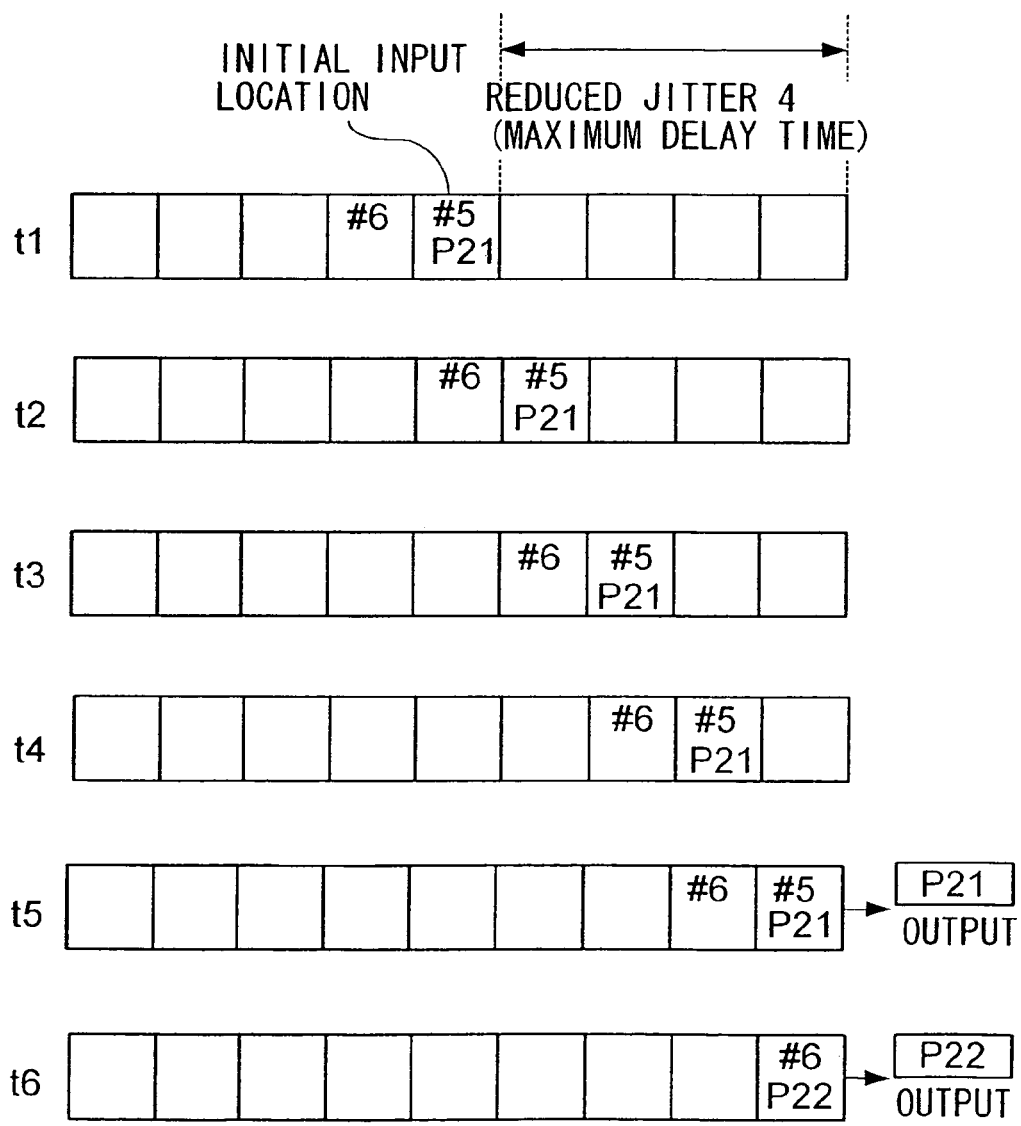
FIG. 16 is an operational example of the system.
Figure 17:
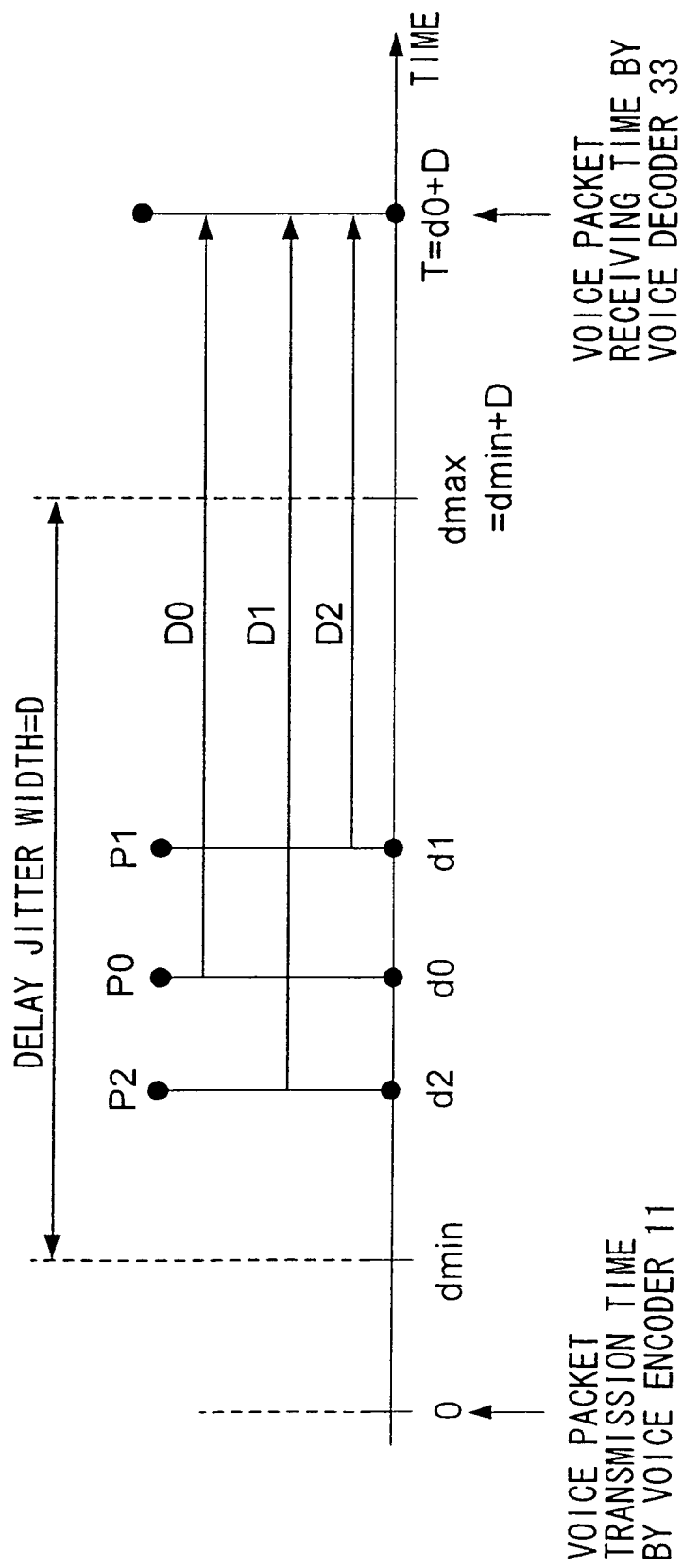
FIG. 17 is an operational example of the system.

FIG. 10A shows voice packets that are output in sequence from the voice encoder 11 of the source terminal 10. FIG. 10B shows voice packets that are received in sequence by the receiving unit 101 of the destination terminal 100. FIG. 10C shows voice packets that are output in sequence to the voice decoder 110. As shown in FIG. 10B, voice packets P0, P1, P2, and P3 serially output from the voice encoder 11 reach the receiving unit 101, each having delayed d0 (=3 s), d1 (=4 s), d2 (=2 s), and d3 (=2 s). During this period, an estimated value of delay time di output by the delay time estimating unit 106 and an estimated value of maximum delay time dmin in the minimum delay time estimating unit 105 will change as follows:

| received packet Pi | estimated delay time di | estimated minimum delay time dmin |
|---|---|---|
| P0 | 3s | 3s |
| P2 | 2s | 2s |
| P1 | 4s | 2s |

Because an estimated value of the minimum delay time dmin is not available in the first voice section SP0, the addition of the network delay jitter width D and is 1 s used as data of holding time da. Therefore, supposing that the delay jitter width D is 3 s, the data of holding time will be 4 s. Given that d0=3 s in the example shown, the total delay time of serial voice packets P0 to P2 turns out to be d0+da=3 s+4 s=7 s.

To the contrary, in the next voice section SP1, the minimum delay time dmin (=2 s) is obtained from estimated values of delay time obtained up to that point, and based on the dmin (=2 s) the holding time will be determined.

Hence, supposing that voice packet P3 is transmitted with delay d3=1 s in the voice section SP1 as shown in FIG. 10A and 10B, the data of holding time will be as follows:

$$da = (dmin + D - d3)$$
$$= 2s + 3s - 1s$$
$$= 4s.$$

The total delay amount for each voice packet of the voice section SP1 starting from voice packet P3, in turn, becomes d3+da=1 s+4 s=5 s.

FIGS. 11A and 11B show an effect of the present embodiment. Supposing that delay time for a first voice packet is d0 in a first voice section SP0, the total delay time d0+D of each voice packet for voice section SP0 will be d0+D.

When a voice packet is received with the minimum delay time dmin=3 in voice section SP0, and in a subsequent voice section SP1 the holding time determined based on this minimum delay time is applied. As a result, the total delay time will be d3+D.

In a conclusion, the present embodiment enables the reduction of the total delay time by deciding the amount of holding time based on a minimum delay time estimated based on estimated delay time of received packets. Also, updating the minimum delay time at the point of receiving a first voice packet after a non-voice section keeps voice quality from deteriorating. For these reasons, the delay jitter reducing device and reducing method are well suited for an application requires real-timeliness and high voice quality such as the Internet telephony.

C: Modifications

The present invention is not limited to the above-described embodiments, but various modifications such as are exemplified below are possible.

(1) In the above-described embodiments, the present invention is applied to a device that receives data segments such as packets through the Internet. However, the present invention may be applied to a device that receives data segments through a wide-area network such as, for example, a frame relay, not being limited to the Internet. The present invention can also be applied to a device that receives data segments through a network where delay jitter is produced in a wireless section as in the mobile network.

(2) In the above-described embodiments, a packet is shown as an example of a data segment. However, a form of data segment is not limited to a packet. Data segments may be anything that includes transmission time or any clue information for finding the transmission time. Data segments may be in any unit such as frames and cells depending on a transmission path or a protocol to be used. Protocols may be the VoIP such as is described above or such things as the Voice over Frame Relay (VoFR).

(3) In the above-described embodiment, the present invention is applied for a device that receives voice packets through a network. However, the present invention is well-suited for transmission of not only voice but video and information requiring real-time transmission.

(4) In the above-described second embodiment, the present invention is applied to a real-time voice transmission in which a voice section and a non-voice section is alternately repeated, where in the voice section voice packets are consecutively transmitted and in the non-voice section the transmission of voice packets is not performed for a consecutive period of time. In this embodiment, the holding time of a voice section is decided based on an estimated value of the minimum delay time acquired in a first previous voice section. However, the application of the present invention is not limited thereto. For example, another form of data transmission is that a first section and a second section repeat by turns, where in the first section information requiring continuity such as motion pictures are transmitted and in a second section information not requiring continuity such as still pictures are transmitted. The present invention can be applied to such a form of data transmission. In this application, the following procedure for reducing the delay jitter will be performed at the destination device:

i) during a period of receiving data segments including information of a second section not requiring continuity, delay time of each data segment and a minimum delay time are estimated;

ii) when receiving a first data segment of a first section right after the second section, delay time of the first data segment is estimated; and iii) based on the above estimated value of the minimum delay time and the estimated value of delay time for the first data segment acquired in the above ii), data of holding time for the first data segment is computed. The computing method is same as what has been described in each of the above embodiments.

(5) In the above-described second embodiment, no packets are transmitted in a non-voice section, but it is also possible to keep transmitting data that designates it being a non-voice section.

(6) In each of the above-described embodiments, the delay jitter width is a fixed value acquired by measuring the value in advance. However, when the delay jitter width turns out to be bigger than the initially supposed amount, it is possible to update the delay jitter width D to be used for computing data of holding time so that such a large delay jitter can be reduced. In the above second embodiment, for example, we assume that it follows from equation (1) that the data of holding time is −3 s, the result being computed based on an estimated value of delay time d0 of a first packet in a voice section SPk, an estimated value of the minimum delay time acquired in the previous voice section SPk−1, and the delay jitter width D. This is because an actual delay jitter width is at least 3 s larger than the initially supposed delay jitter width D. Therefore, the delay jitter width D is to be incremented 3 s, so that the data of holding time becomes 0 s. This renewed delay jitter width D is used for computing data of holding time from equation (1) in the subsequent voice section SPk+1.

(7) A device for reducing delay jitter with respect to the present invention can be provided with a relay device of a network or a router, for example. This modification is for the sake of reducing delay jitter in the middle of a transmission path because a long transmission path leads to a long delay jitter width.

(8) The minimum delay time maybe estimated in a certain limited period. To illustrate, the following example can be conceived. First, in the beginning of a session, before initiating the voice packet transmission, a training packet including a time stamp is repeatedly transmitted from a source terminal to a destination terminal. At the destination terminal, a minimum delay time dmin is estimated from estimated values of delay time for these individual training packets. Data of holding time da applied to a subsequent voice packet is obtained from the aforementioned equation (1) using the dmin.

(9) In the above-mentioned embodiment, a transmission time of a packet is estimated from a time stamp. However, in a case where a time stamp is not included in a packet, it is possible to estimate the transmission time from such things as serial numbers included in a packet.

(10) The embodiments of the present invention include an embodiment such as of producing and selling a device which reduces delay jitter as disclosed in the above-mentioned embodiments as well as an embodiment of distributing through a telecommunication line a program for making a network-connected computer function as a delay jitter reducing device as disclosed in the above embodiments and an embodiment of distributing such a program recorded in a computer-readable recording medium.

What is claimed is:

1. A delay jitter reducing device, comprising:
a receiving unit sequentially receiving chronological data segments through a network;
a time detecting unit for obtaining a reception time of each data segment received by said receiving unit;
transmission time estimating means for estimating transmission time of each data segment received by said receiving unit;
a delay time estimating unit for estimating a delay time required for transmitting each data segment based on said reception time and said transmission time of each data segment;
a minimum delay time estimating unit for estimating a minimum delay time in transmitting a data segment through the network from the estimated values of delay time of a plurality of data segments obtained from said delay time estimating unit;
relative delay time computing means for obtaining a relative delay time by subtracting said minimum delay time from the estimated value of delay time of a data segment estimated by said delay time estimating unit; and
delay means for obtaining an amount of holding time corresponding to each data segment by subtracting the relative delay time of each data segment from a maximum delay time to be reduced, and outputting each data segment after delaying each data segment for the amount of holding time corresponding to each data segment.

2. A delay jitter reducing device according to claim 1, wherein said receiving unit receives a plurality of training data segments before receiving a data segment to which delay time is to be applied; and
wherein said minimum delay estimating unit estimates said minimum delay time from estimated values of delay time for said plurality of training data segments.

3. A delay jitter reducing device according to claim 1, wherein said minimum delay time estimating unit obtains estimated values of delay time for a plurality of data segments that are received in a certain period and estimates said minimum delay time from these estimated values.

4. A delay jitter reducing device according to claim 3, wherein said data segments are a data unit representing voice.

5. A delay jitter reducing device according to claim 1, wherein said receiving unit alternately receives a data segment belonging to a first section that requires continuity and a data segment belonging to a second section that does not require continuity; and wherein said minimum delay time estimating unit estimates, at the point of receiving a first data segment belonging to the first section, said minimum delay time for data segments that have been receive up to the time point.

6. A delay jitter reducing device according to claim 1, wherein said delay time estimating unit estimates delay time of said each data segment based on transmission time information or any clue information for transmission time accompanied by said data segment and reception time thereof.

7. A delay jitter reducing method, comprising:

a receiving process sequentially receiving chronological data segments through a network;

a time detecting process for obtaining a reception time of each data segment received by a receiving unit;

a transmission time estimating process for estimating transmission time of each data segment received by said receiving unit;

a delay time estimating process for estimating delay time required for transmitting each data segment based on said reception time and said transmission time of each data segment;

a minimum delay time estimating process for estimating a minimum delay time in transmitting a data segment through the network from the estimated values of delay time of a plurality of data segments obtained from said delay time estimating unit;

a relative delay time computing process for obtaining a relative delay time by subtracting said minimum delay time from the estimated value of delay time of a data segment estimated by said delay time estimating unit; and a delay process for obtaining an amount of holding time corresponding to each data segment by subtracting the relative delay time of each data segment from a maximum delay time to be reduced, and outputting each data segment after delaying each data segment for the amount of holding time corresponding to each data segment.

8. A computer-readable recording medium that has recorded a program for making a network-connected computer execute:

a receiving process sequentially receiving chronological data segments through the network;

a time detecting process for obtaining a reception time of each data segment received by a receiving unit;

a transmission time estimating process for estimating transmission time of each data segment received by said receiving unit;

a delay time estimating process for estimating delay time required for transmitting each data segment based on said reception time and said transmission time of each data segment;

a minimum delay time estimating process for estimating a minimum delay time in transmitting a data segment through the network from the estimated values of delay time of a plurality of data segments obtained from a delay time estimating unit;

a relative delay time computing process for obtaining a relative delay time by subtracting said minimum delay time from the estimated value of delay time of a data segment estimated by said delay time estimating unit; and a delay process for obtaining an amount of holding time corresponding to each data segment by subtracting the relative delay time of each data segment from a maximum delay time to be reduced, and outputting each data segment after delaying each data segment for the amount of holding time corresponding to each data segment.

* * * * *

UNITED STATES PATENT AND TRADEMARK OFFICE
CERTIFICATE OF CORRECTION

PATENT NO. : 6,985,501 B2 Page 1 of 1
APPLICATION NO. : 09/827639
DATED : January 10, 2006
INVENTOR(S) : Takashi Suzuki et al.

It is certified that error appears in the above-identified patent and that said Letters Patent is hereby corrected as shown below:

On the Title Page

Item (75), replace "Yokosuka" with --Yokosuka-shi-- (both instances).

Item (75), replace "Yokohama" with --Yokohama-shi-- (both instances).

In the Claims

In column 15, claim 5, line 4, after "segments that have been" replace "receive" with --received--.

Signed and Sealed this

Twenty-seventh Day of April, 2010

David J. Kappos
*Director of the United States Patent and Trademark Office*